United States Patent
Tov'ar et al.

(10) Patent No.: US 7,763,392 B2
(45) Date of Patent: Jul. 27, 2010

(54) INTEGRATED FUEL-AIR DELIVERY SYSTEM

(75) Inventors: Miguel Tov'ar, Ann Arbor, MI (US); Jonathan R. Rice, Whitmore Lake, MI (US); Michael Gorski, Dexter, MI (US); David Arft, Ann Arbor, MI (US)

(73) Assignee: Adaptive Materials, Inc., Ann Arbor, MI (US)

( * ) Notice: Subject to any disclaimer, the term of this patent is extended or adjusted under 35 U.S.C. 154(b) by 277 days.

(21) Appl. No.: 12/059,002

(22) Filed: Mar. 31, 2008

(65) Prior Publication Data
US 2008/0241609 A1 Oct. 2, 2008

Related U.S. Application Data

(60) Provisional application No. 60/908,773, filed on Mar. 29, 2007.

(51) Int. Cl.
*H01M 8/02* (2006.01)
*H01M 8/04* (2006.01)
(52) U.S. Cl. ....................................... 429/513

(58) Field of Classification Search .................... 429/12, 429/13, 17
See application file for complete search history.

(56) References Cited

U.S. PATENT DOCUMENTS

| | | | |
|---|---|---|---|
| 4,002,805 A | 1/1977 | Waldman | |
| 6,007,931 A | 12/1999 | Fuller et al. | |
| 6,232,005 B1 | 5/2001 | Pettit | |
| 6,440,596 B1 | 8/2002 | Ruhl et al. | |
| 7,144,644 B2 | 12/2006 | Haltiner, Jr. et al. | |
| 2006/0251935 A1* | 11/2006 | Barrett et al. | 429/22 |

FOREIGN PATENT DOCUMENTS

JP 55128643 A * 10/1980

* cited by examiner

*Primary Examiner*—Gregg Cantelmo
(74) *Attorney, Agent, or Firm*—Robert Svoboda

(57) ABSTRACT

An integrated fuel and air delivery system for a fuel cell that includes a pump and an air inlet member connected to the pump. Additionally, an air outlet member is connected to the pump. Desired quantities of fuel and air are mixed in the air outlet member and resonance of the fuel and air are removed prior to introduction into the fuel cell.

20 Claims, 10 Drawing Sheets

US 7,763,392 B2

INTEGRATED FUEL-AIR DELIVERY SYSTEM

CROSS-REFERENCE TO RELATED APPLICATIONS

This application claims priority of U.S. Provisional Patent Application Ser. No. 60/908,773 filed Mar. 29, 2007, which is incorporated herein by reference.

FIELD OF THE INVENTION

The invention relates to fuel and air delivery systems for fuels cells.

BACKGROUND OF THE INVENTION

Fuel cells, including solid oxide fuel cells require introduction of a desired amount of fuel and air in order to operate in an efficient manner. Current fuel cells generally include multiple separate components that may be linked with numerous connections, such as tubes to provide fuel and air to a fuel cell. Such multiple connections provide an increased opportunity for failure and the separate components occupy a large amount of space within a fuel cell. Such configurations do not lend themselves for use in a portable fuel cell. Additionally, the separate components often need multiple support structures to mount them to a fuel cell. In the prior art, air and fuel introduced into a fuel may include resonances and pulses that may affect the control and metering of fuel and air into a fuel cell.

There is therefore a need in the art for a fuel and air delivery system for a fuel cell that eliminates such resonances. There is also a need in the art for a fuel and air delivery system that may be assembled efficiently and reduce the number of connections. There is also a need in the art for a fuel and air delivery system that is in the form of a compact module that is self supporting. There is also a need in the art for a fuel and air delivery system that mixes the fuel and air in a desired amount prior to introduction into a fuel cell.

SUMMARY OF THE INVENTION

In one aspect there is disclosed an integrated fuel and air delivery system for a fuel cell that includes at least one pump and an air inlet member connected to the pump. Additionally, an air outlet member is connected to the pump. Desired quantities of fuel and air are mixed in the air outlet member and resonance of the fuel and air are removed prior to introduction into the fuel cell.

In another aspect, there is disclosed an integrated fuel and air delivery system for a fuel cell that includes at least one pump and an air inlet member connected to the pump. Additionally, an air outlet member is connected to the pump. A fuel input and output member is linked with the air outlet member. A fuel sensor member is connected to the fuel input and output member. Desired quantities of fuel and air are mixed in the air outlet member and resonance of the fuel and air are removed prior to introduction into the fuel cell. The fuel and air delivery system is a self supporting module that may be linked with the fuel cell.

In another aspect, there is disclosed an integrated fuel and air delivery system for a fuel cell that includes at least one pump and an air inlet member connected to the pump. An air outlet member is connected to the pump. A mixing member is connected to the air outlet member. Desired quantities of fuel and air are mixed in the mixing member and resonance of the fuel and air are removed prior to introduction into the fuel cell.

DETAILED DESCRIPTION OF THE PREFERRED EMBODIMENTS

Figure 1:
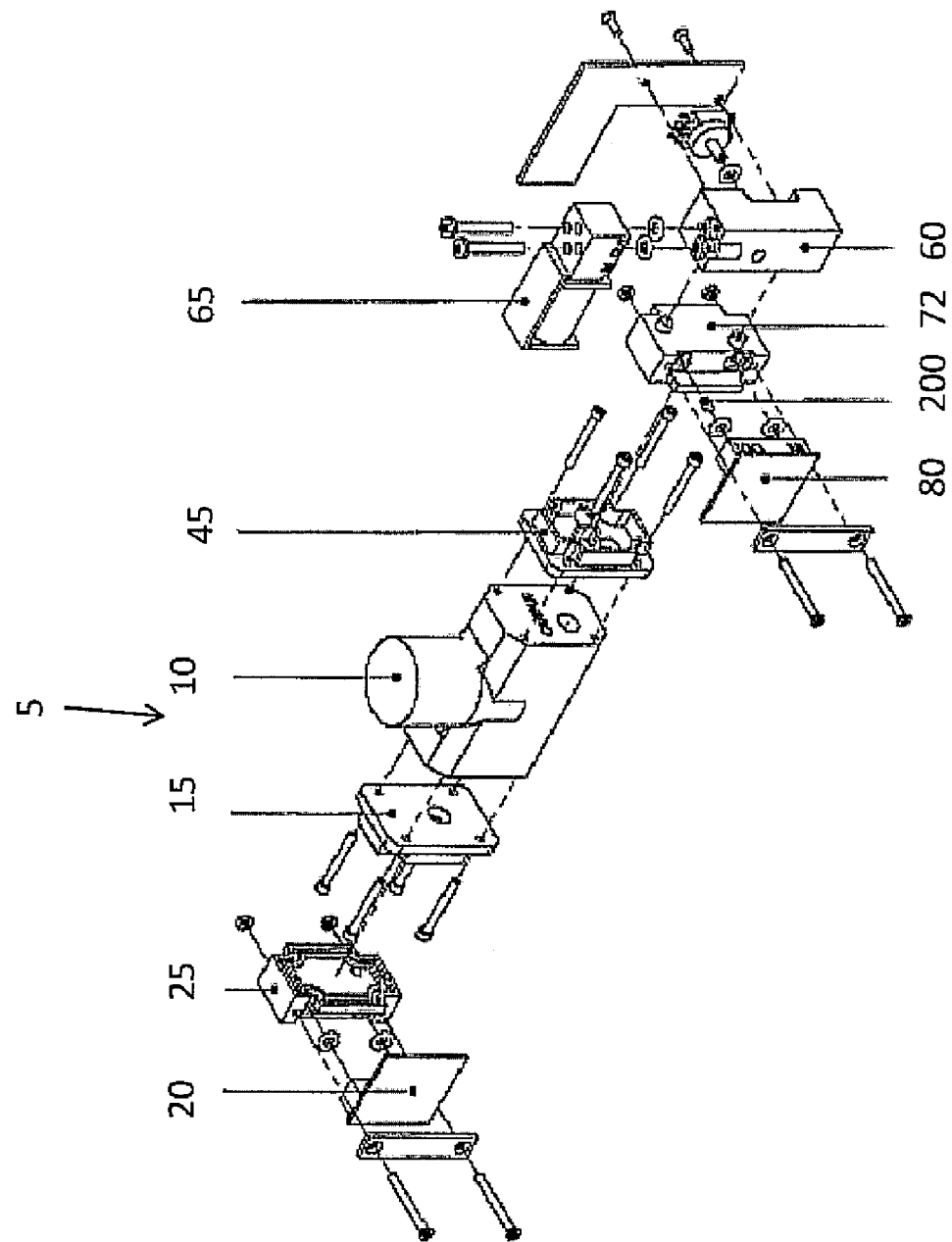
FIG. 1 is an exploded perspective view of one embodiment of a fuel air delivery apparatus.
Figure 2:
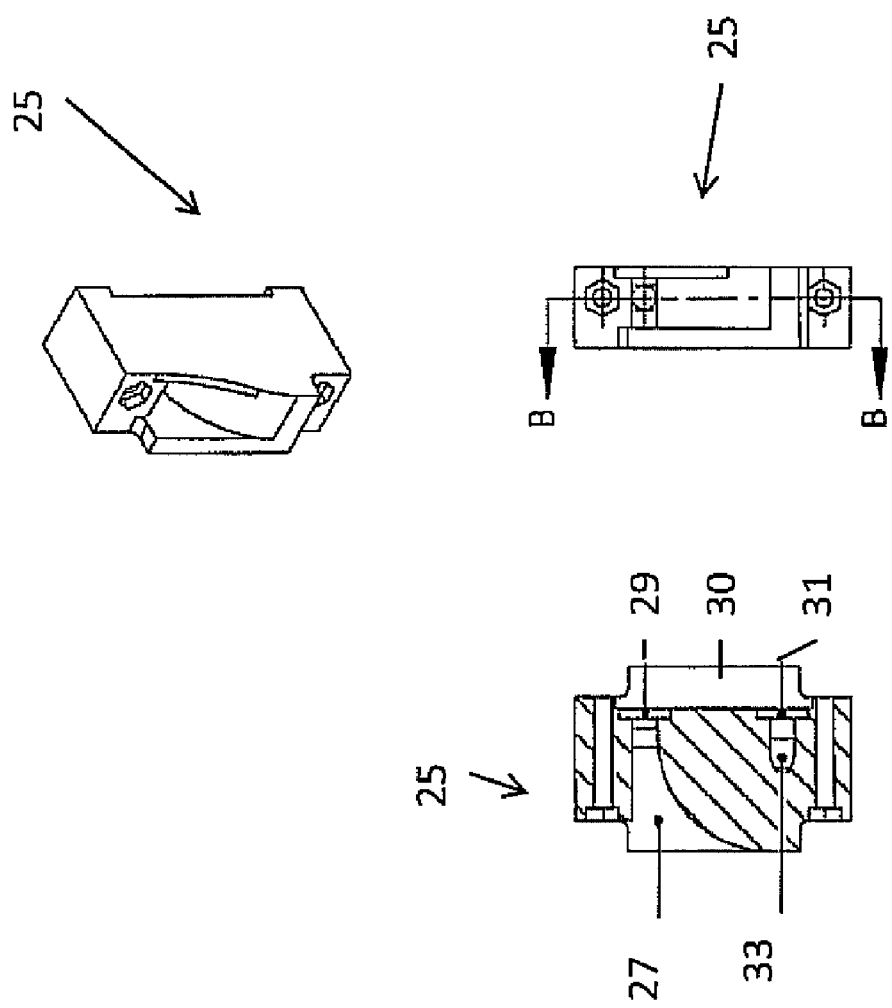
FIG. 2 are views of an air sensor manifold of FIG. 1.
Figure 3:
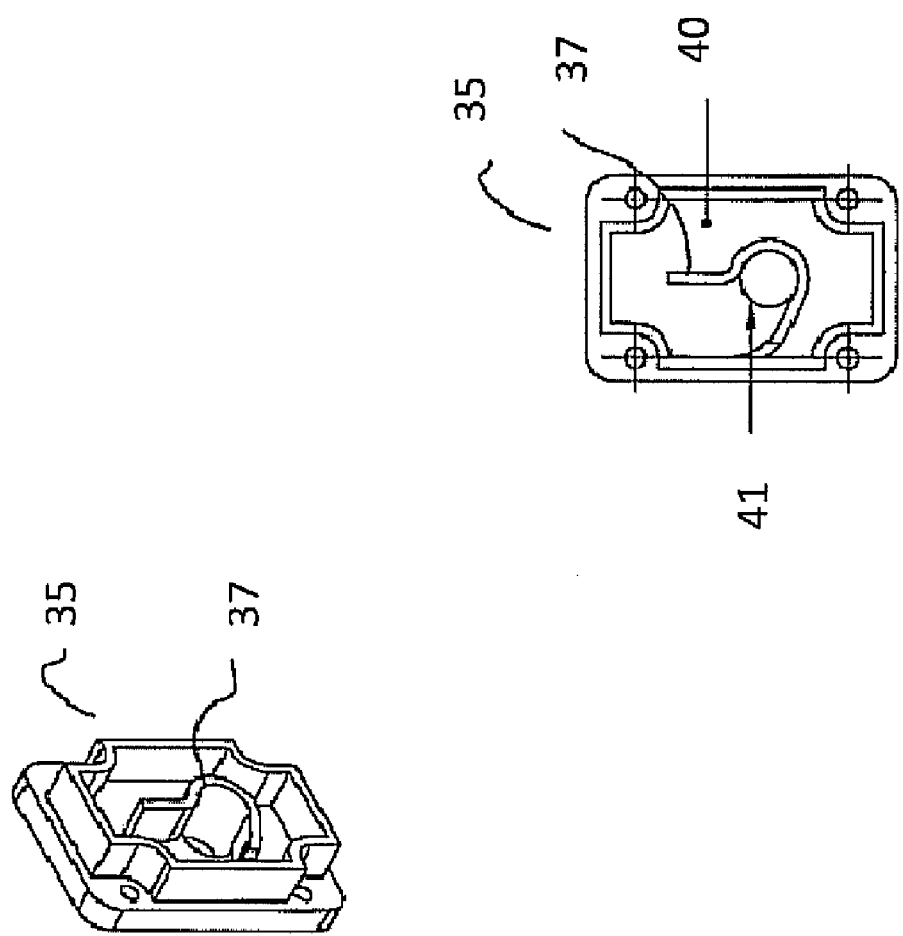
FIG. 3 are views of an air inlet member of FIG. 1.

In one embodiment shown in FIG. 1, a fuel air delivery apparatus 5 for a fuel cell includes a pump 10. The pump 10 may be any suitably sized pump 10 and may be any suitable type pump 10. In one aspect the pump 10 may be a diaphragm type pump. Additionally multiple pumps 10 may also be utilized. An air inlet member 15 is connected to the pump 10 to allow entry of ambient air surrounding the pump 10. The air inlet member 15 may include a sensor member 20 having a sensor manifold 25, shown in FIG. 2 and a corresponding mass flow sensor calibrated for air for detecting an air flow. The sensor manifold 25 may include an air inlet 27 drawing air in from an ambient source and an air outlet 29 connected to the sensor. The air inlet 27 may include a filter. The sensor manifold 25 may also include an air inlet 31 from the sensor and an air outlet 33 linked with the pump 10. The air inlet member 15 may also include an air inlet chamber 35, shown in FIG. 3 that is connected to the pump 10. The air inlet chamber 35 may include various formations 37 for directing a flow of air and defining an air chamber 40. The air chamber 40 is linked to the pump 10 by an air outlet 41.

Figure 4:
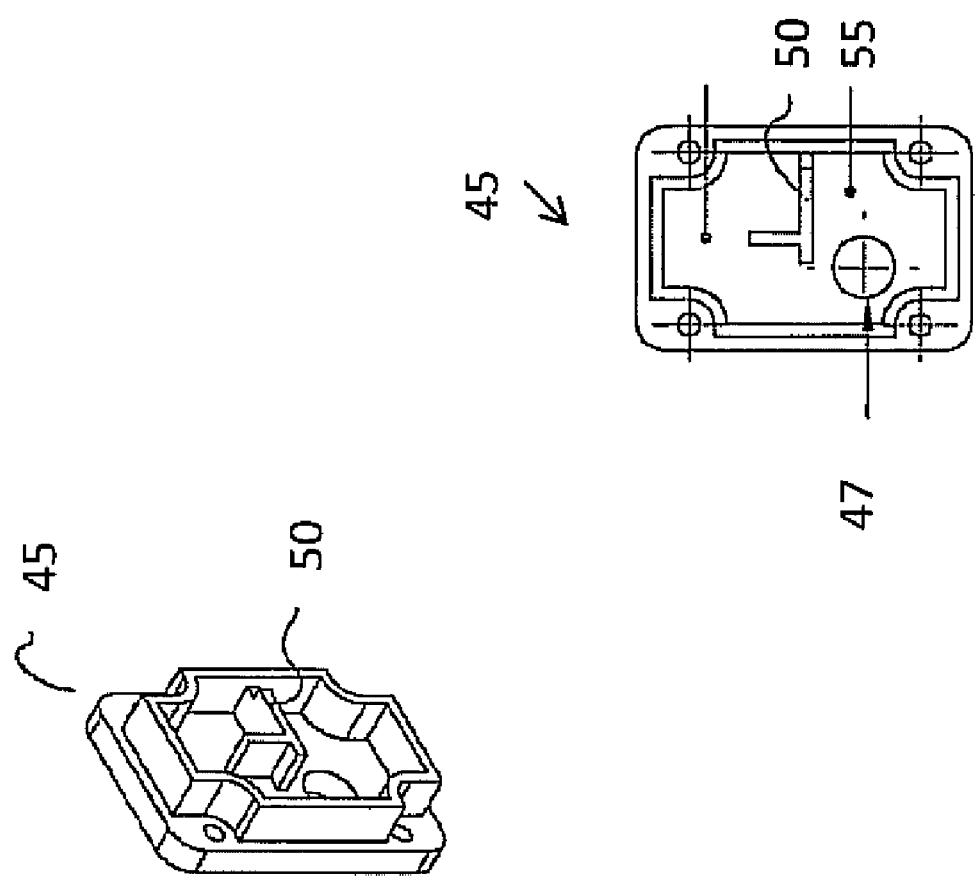
FIG. 4 are views of the air outlet member of FIG. 1.

An air outlet member 45 is connected on an opposite side of the pump 10 and is shown in various views in FIG. 4. The air outlet member 45 may include an air inlet 47 from the pump 10 and a plurality of mixing channels or pathways 50 that regulate a resonance of the fuel and air. The pathways 50 define an accumulation chamber 55 for mixing of the fuel and air and will be described in more detail below.

Figure 5:
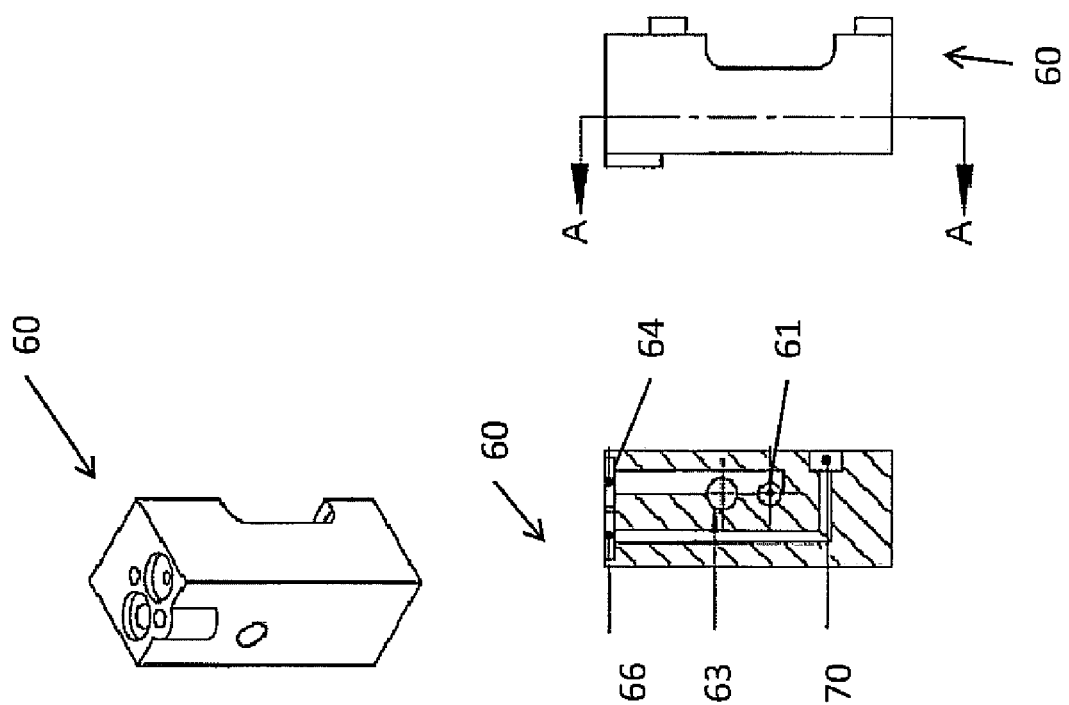
FIG. 5 are views of a fuel input and output member of FIG. 1.

A fuel input and output member 60, shown in FIG. 5, is connected to a fuel source that provides fuel. The fuel inlet and outlet member 60 may include a fuel inlet 61, a fuel pressure tap 63 for a pressure sensor, a fuel outlet 64 to a valve member 65, a fuel inlet 66 to the valve member 65 and a fuel pass through 70. The fuel input and output member 60 is connected to the fuel valve member 65. The fuel valve member 65 may be adjusted to control an amount of fuel delivered to the air outlet member 45. The fuel valve member 65 may be connected to a fuel sensor member 72.

Figure 6:
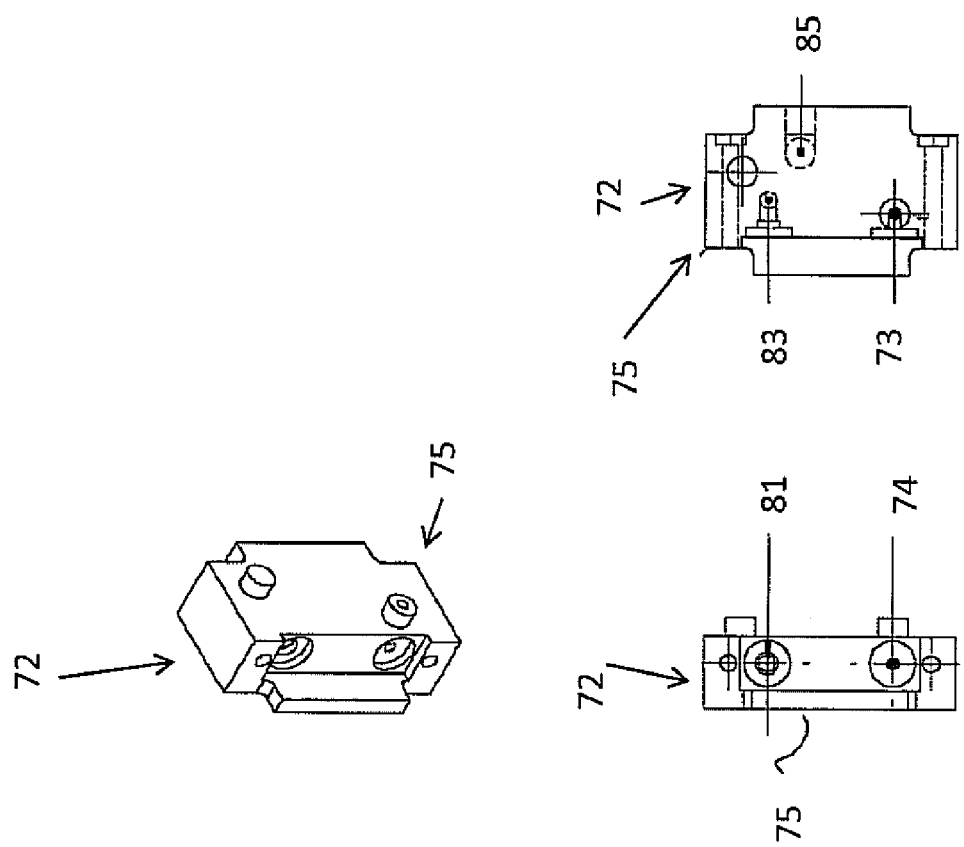
FIG. 6 are views of a fuel sensor member of FIG. 1.

The fuel sensor member 72 may include any appropriate fuel mass flow sensor. The sensor member 72 may include a sensor manifold 75 that is connected with the fuel input and output member 60. The sensor manifold 75, as shown in FIG. 6 may include a fuel inlet 73 from the valve member 65 and a fuel outlet 74 to the sensor. Additionally, the fuel sensor manifold 75 may include a fuel inlet 81 from the sensor and a fuel outlet 83 to the air outlet member 45. The sensor manifold 75 also includes a blended air and fuel outlet 85 that is coupled to a fuel cell.

In use air is drawn into the air inlet member 15 via the pump 10 and is fed into the air sensor member 20 for monitoring a flow rate of air introduced into the inlet. The air is returned from the sensor member 20 and enters the air inlet chamber 35 for introduction into the pump 10. The air exits the pump 10 at the air outlet member 45 connected at an opposite side of the pump 10.

Fuel is introduced into the fuel input and output member 60 from a fuel source. The fuel enters a fuel pressure tap 63 and is routed to the fuel valve member 65 via a fuel outlet 64 to the valve member 65. The fuel is reintroduced to the input and output member 60 from a fuel inlet 66 from the valve member 65 and enters a fuel pass through 70 that is connected to the fuel sensor member 72. The fuel enters the fuel sensor member and is reintroduced from the sensor member 72 into the air outlet member 45. The fuel and air mix in the air outlet member 45 about the mixing channels 50 in the accumulation chamber 55 and a resonance of the fuel and air is regulated. The mixed fuel and air are then routed back into the air sensor member 72 and into a blended outlet 85 that is connected with a fuel cell.

Figure 7:
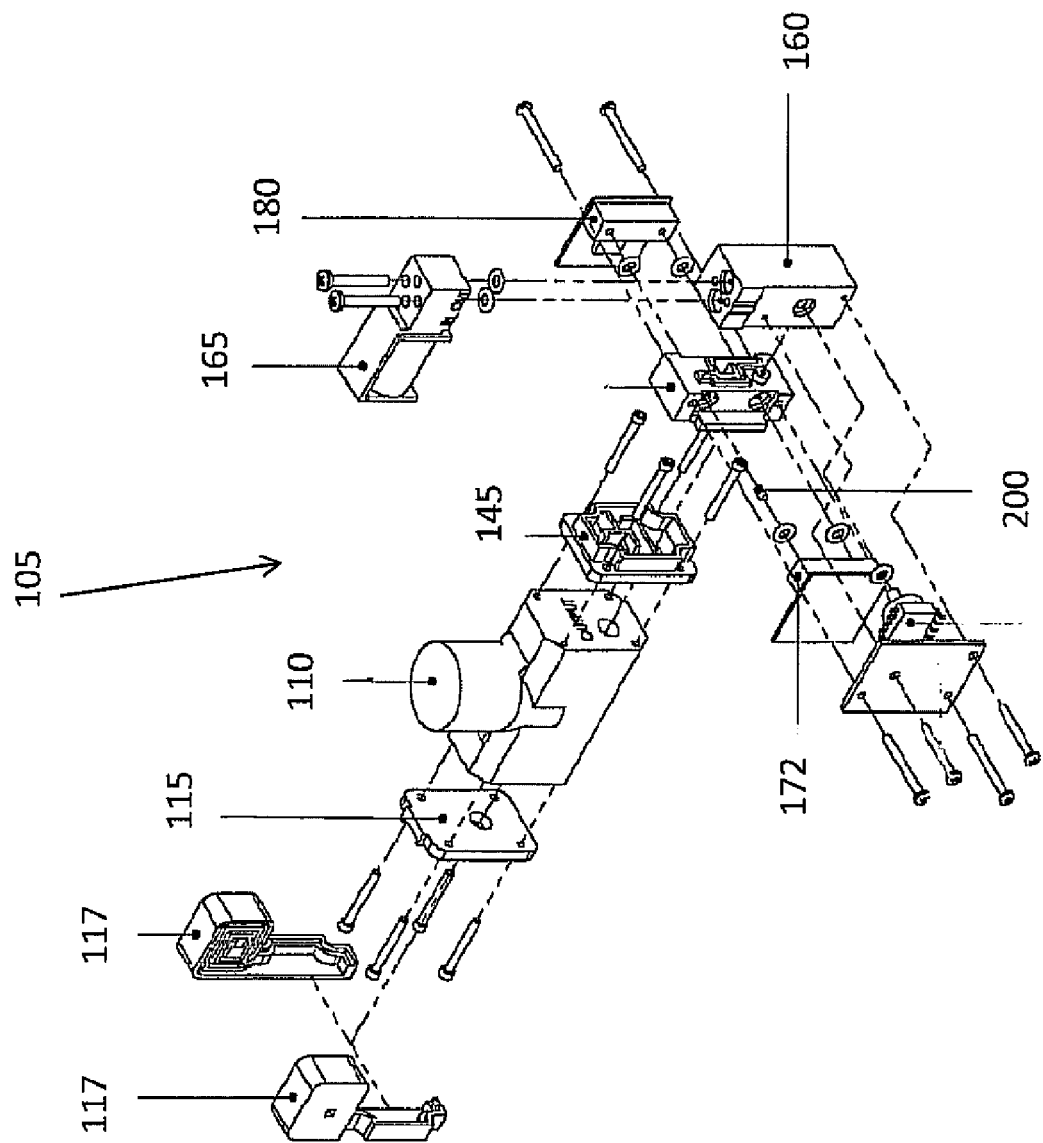
FIG. 7 is an exploded perspective view of a second embodiment of a fuel air delivery apparatus.

Referring to FIG. 7 there is shown a second embodiment of a fuel air delivery apparatus 105. The second embodiment also includes a pump 110 and an air inlet member 115. The air inlet member 115 does not include an air sensor linked to the inlet as described previously. Additionally, the air inlet member 115 may include an air filter and muffler 117 for regulating the quality and flow of air introduced into the air inlet member 115.

Figure 8:
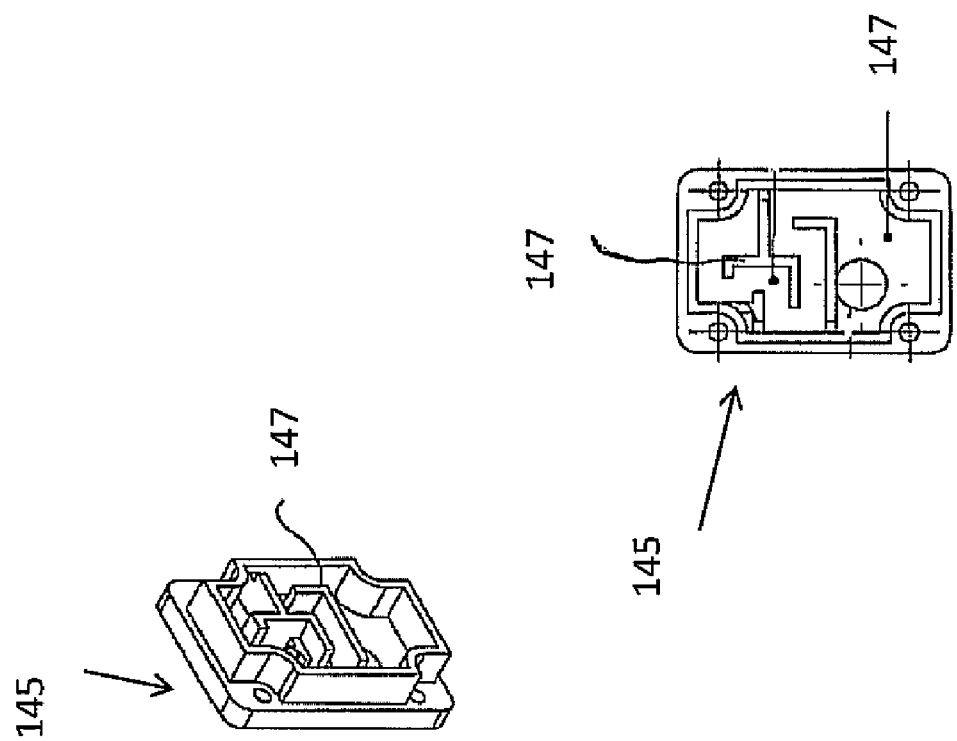
FIG. 8 are views of the air outlet member of FIG. 7.

The second embodiment also includes an air outlet member 145, shown in FIG. 8 connected on an opposite side of the pump 110. The air outlet member 145 of the second embodiment includes various paths or formations 147 for dampening the pulses of the air introduced from the pump 110 and regulating a resonance of the air.

Figure 9:
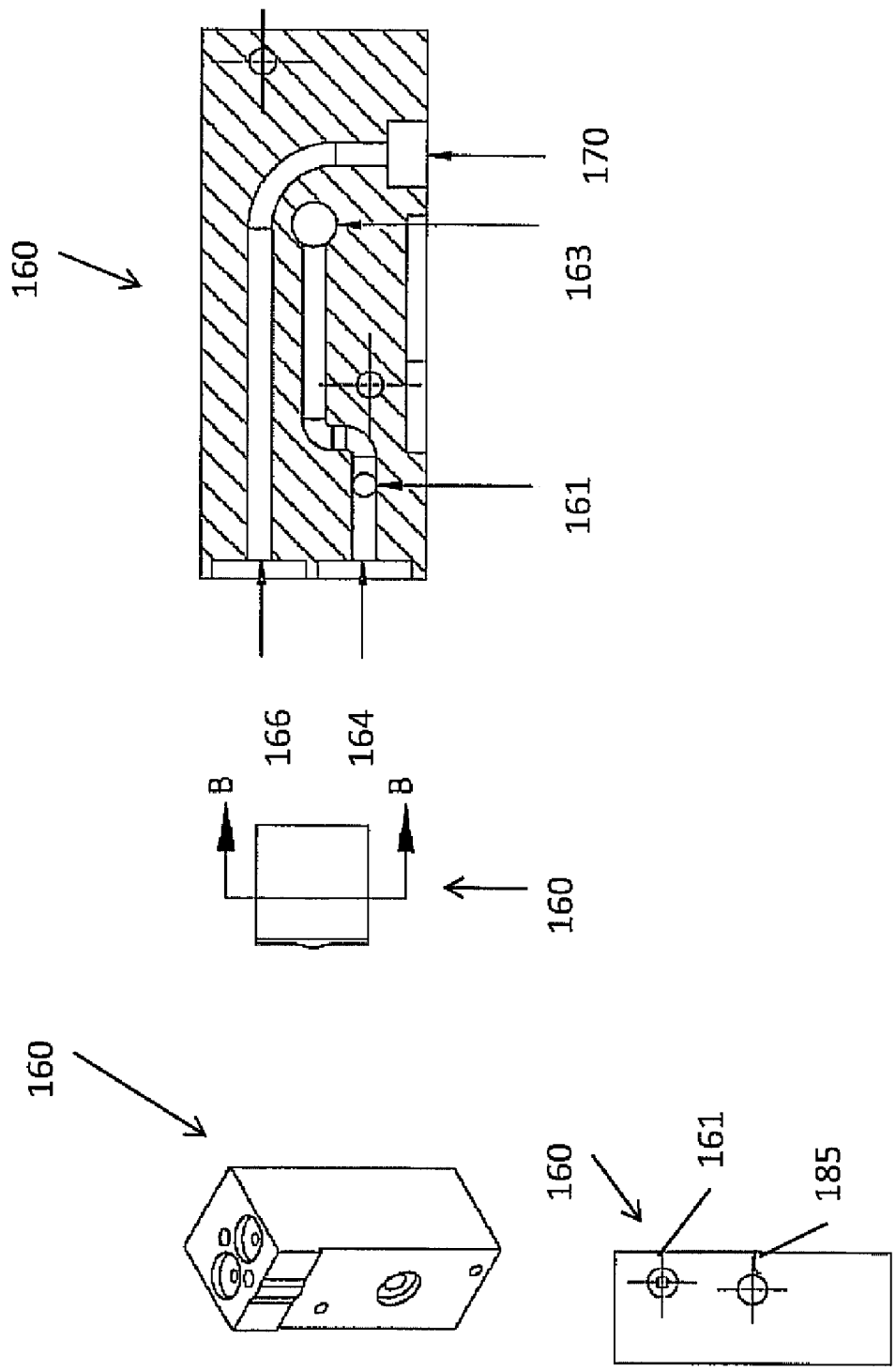
FIG. 9 are views of the fuel inlet and outlet member of FIG. 7.

The second embodiment also includes a fuel input and output member 160. The fuel input and output member 160, shown in FIG. 9 includes a fuel inlet 161 from a source of fuel, a fuel outlet 164 to a valve member 165, a fuel pressure tap 163 for a pressure sensor, a fuel inlet 166 from the valve member 165 and a fuel pass through 170. Additionally, the input and output member 160 includes a blended fuel air output 185 that is coupled to a fuel cell, and will be described in more detail below.

Figure 10:
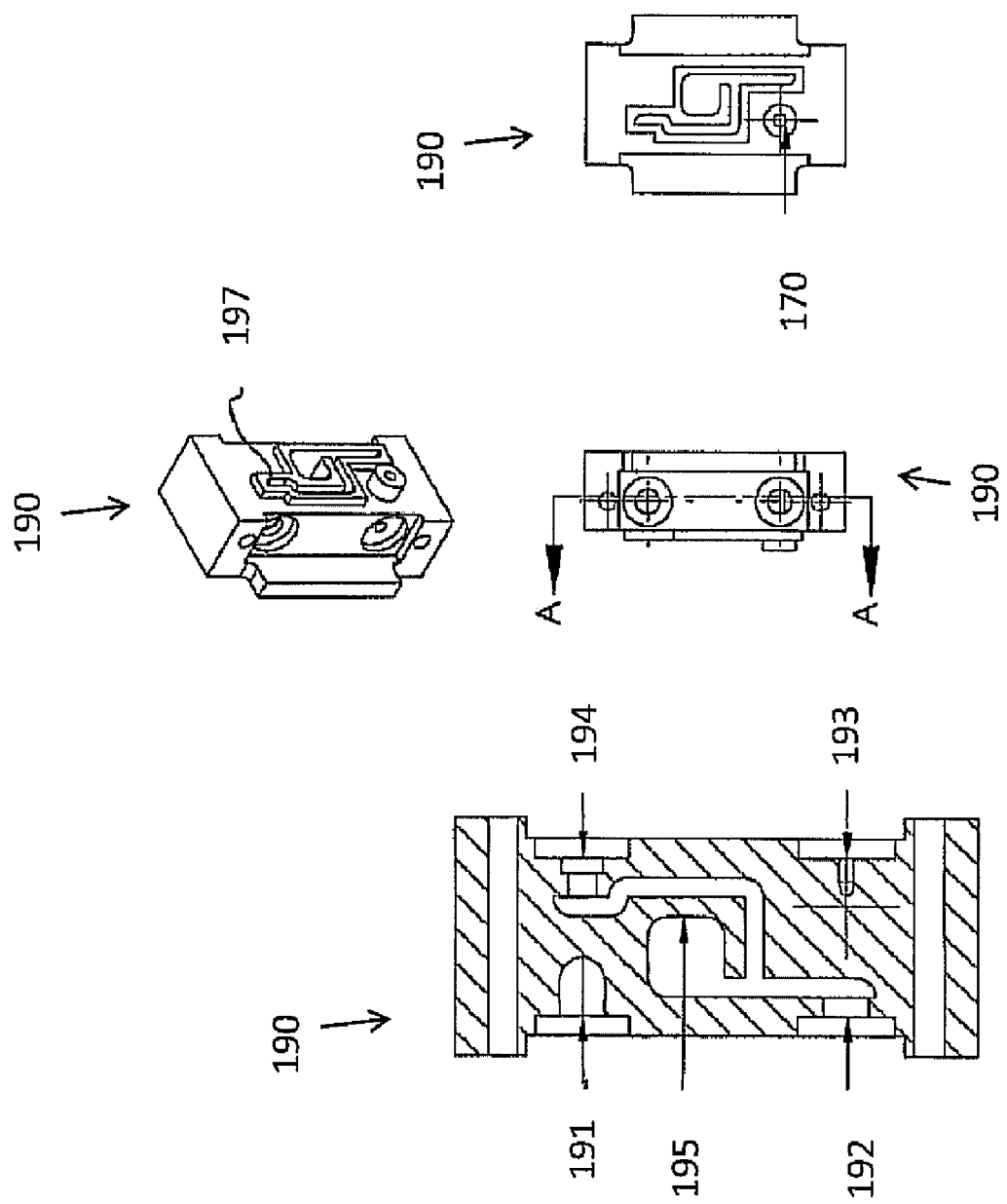
FIG. 10 are views of the mixing member of FIG. 7.

The second embodiment of the fuel air delivery apparatus 105 includes a mixing member 190. The mixing member 190, shown in FIG. 10 includes an air inlet 191 from the pump 110, an air inlet 192 from the air sensor member 120, a fuel inlet 193 from the valve member 165, a fuel inlet 194 from the fuel sensor 172, a mixing chamber 195 and a fuel pass through 170 connecting the mixing chamber 195 with the input and output member 160. The mixing member 190 includes formations or paths 197 that define the mixing chamber 195 and regulate a resonance of the fuel and air.

In use air is drawn into the air inlet member 115 via the pump 110 through the filter and muffler 117. The air exits the pump 110 at an air outlet member 145 connected at an opposite side of the pump 110. The air is directed about the various formations 147 of the air outlet member 145 to dampen pulses introduced from the pump 110.

Fuel is introduced into the fuel input and output member 160 from a fuel source. The fuel enters through the inlet 161 and past a pressure tap 163 for detecting a pressure of the fuel and is routed to a fuel valve member 165 via a fuel outlet 164 to the valve member 165. The fuel is reintroduced to the input and output member 160 from a fuel inlet 166 from the valve member 165 and enters a fuel pass through 170 that is connected to a fuel sensor member 172. The fuel enters the fuel sensor member 172 and is reintroduced from the sensor member 172 into the mixing member 190.

Air is introduced from the air outlet member 145 into an air sensor member 120. The air sensor member 120 may include a sensor manifold 125 as described above in the first embodiment. The sensor manifold 125 may include an air inlet receiving air from the air outlet member 145 and an air outlet from the sensor member 120 into the mixing member 190. The fuel and air mix in the mixing chamber 195 about the mixing channels or paths 197. The mixed fuel and air are then routed back into the input and output member 160 via a fuel pass through of the mixing member 190 and into a blended outlet 185 that is connected with a fuel cell.

Both of the embodiments may include an orifice 200 linked with the fuel sensors 72, 172 to prevent air pressure from the system from affecting the detected values in the fuel sensor 72, 172. It should be realized that additional components such as a fuel pre-heater may also be included in either of the first or second embodiments described above. Additionally, both of the embodiments are self supporting such that they may be attached to the fuel cell as a module. The self supporting fuel air delivery apparatus 5, 105 reduces the number and complexity of connections to the fuel cell. Additionally, the self supporting fuel air delivery apparatus 5, 105 reduces the volume needed for typical installations and reduces noise associated with the assembly.

The invention has been described in an illustrative manner. It is to be understood that the terminology, which has been used, is intended to be in the nature of words of description rather than limitation. Many modifications and variations of the invention are possible in light of the above teachings. Therefore, within the scope of the appended claims, the invention may be practiced other than as specifically described.

The invention claimed is:

1. An integrated fuel and air delivery system for a fuel cell comprising:
   a pump;
   an air inlet member connected to the pump;
   an air outlet member connected to the pump; and
   a fuel input and output member connected to the air outlet member;
   wherein desired quantities of fuel and air are mixed in the air outlet member and wherein resonance of the fuel and air are removed prior to introduction into the fuel cell.

2. The integrated fuel and air delivery system of claim 1 including a fuel sensor member connected to the fuel input and output member.

3. The integrated fuel and air delivery system for a fuel cell of claim 1 wherein the integrated fuel and air delivery system is a self supporting module that may be linked with a fuel cell.

4. The integrated fuel and air delivery system for a fuel cell of claim 1 wherein pulses applied to the fuel and air from the pump are dampened prior to introduction into the fuel cell.

5. The integrated fuel and air delivery system for a fuel cell of claim 1 wherein the air inlet member includes an air inlet chamber having formations thereon for directing the flow of air, the air chamber linked to the pump at an air outlet.

6. The integrated fuel and air delivery system for a fuel cell of claim 1 including an air sensor member connected to the air inlet member.

7. The integrated fuel and air delivery system for a fuel cell of claim 6 wherein the air sensor member includes a sensor manifold having an air inlet drawing air in from an ambient source and an air outlet connected to a sensor, the sensor manifold including another air inlet from the sensor and another air outlet linked with the pump.

8. The integrated fuel and air delivery system for a fuel cell of claim 2 wherein the fuel sensor member is further connected to the air outlet member.

9. The integrated fuel and air delivery system for a fuel cell of claim 1 wherein the air outlet member includes a plurality of mixing channels defining an accumulation chamber.

10. The integrated fuel and air delivery system for a fuel cell of claim 2 wherein the fuel input and output member includes a fuel inlet, a fuel pressure tap for a pressure sensor, a fuel outlet to a valve member, a fuel inlet to the valve member and a fuel pass through.

11. The integrated fuel and air delivery system for a fuel cell of claim 10 wherein the fuel sensor member includes a sensor manifold that is connected with the fuel input and output member.

12. The integrated fuel and air delivery system for a fuel cell of claim 11 wherein the sensor manifold includes a fuel inlet from the valve member, a fuel outlet to a sensor, another fuel inlet from the sensor, another fuel outlet to the air outlet member and a blended air fuel outlet for connecting to the fuel cell.

13. The integrated fuel and air delivery system for a fuel cell of claim 1 wherein the air outlet member includes formations for damping pulses introduced to the fuel and air from the pump.

14. The integrated fuel and air delivery system for a fuel cell of claim 13 wherein the fuel input and output member includes a fuel inlet, a fuel pressure tap for a pressure sensor, a fuel outlet to a valve member, a fuel inlet to the valve member, a fuel pass through and a blended fuel air output for connection to the fuel cell.

15. The integrated fuel and air delivery system for a fuel cell of claim 14 including a fuel sensor member, an air sensor member, a mixing member having an air inlet from the pump, an air inlet from the air sensor member, a fuel inlet from the valve member, a fuel inlet from the fuel sensor member, a mixing chamber and a fuel pass through connecting the mixing chamber with the fuel input and output member.

16. An integrated fuel and air delivery system for a fuel cell comprising: at least one pump; an air inlet member connected to the pump; an air outlet member connected to the pump; a fuel input and output member linked with the air outlet member; a fuel sensor member connected to the fuel input and output member; wherein desired quantities of fuel and air are mixed in the air outlet member and wherein resonance of the fuel and air are removed prior to introduction into the fuel cell and wherein the integrated fuel and air delivery system is self supporting for linking with the fuel cell.

17. An integrated fuel and air delivery system for a fuel cell comprising:
    a pump;
        an air inlet member connected to the pump;
        an air outlet member connected to the pump;
        a mixing member connected to the air outlet member; and
        a fuel input and output member connected to the mixing member,
    wherein desired quantities of fuel and air are mixed in the mixing member and wherein resonance of the fuel and air are removed prior to introduction into the fuel cell.

18. The integrated fuel and air delivery system for a fuel cell of claim 17 including an air sensor member connected with the air outlet member and a fuel sensor member connected to the fuel input and output member.

19. The integrated fuel and air delivery system for a fuel cell of claim 17 wherein the integrated fuel and air delivery system is self supporting for linking with a fuel cell.

20. The integrated fuel and air delivery system for a fuel cell of claim 17 wherein pulses applied to the fuel and air from the pump are dampened prior to introduction into the fuel cell.

\* \* \* \* \*